July 24, 1928.
F. G. BROTZ
SWINGING SPOUT VALVE
Filed Aug. 26, 1927
1,678,377
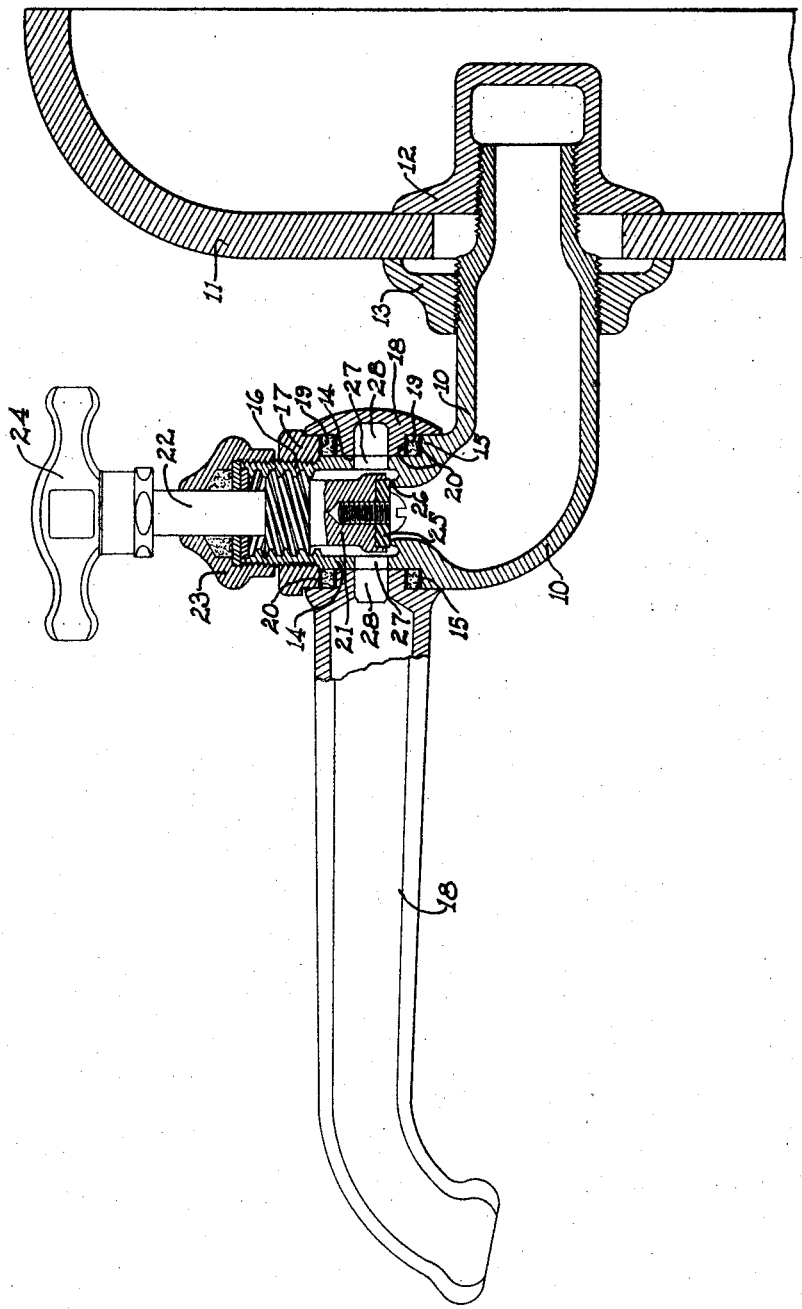
WITNESSES
INVENTOR
Frank G. Brotz
By R S C Caldwell
ATTORNEY Patented July 24, 1928.

1,678,377

UNITED STATES PATENT OFFICE.

FRANK G. BROTZ, OF KOHLER, WISCONSIN, ASSIGNOR TO KOHLER COMPANY, OF KOHLER, WISCONSIN, A CORPORATION OF WISCONSIN.

SWINGING-SPOUT VALVE.

Application filed August 26, 1927. Serial No. 215,662.

This invention relates to swinging spout valves for kitchen sinks and the like, where it is desired to have the faucet discharge either in the sink or in an adjoining electric dishwasher container, or at different parts of the sink, and has for its object to provide a swinging spout mounted directly on the valve casing and capable of freely turning without binding and without leakage.

Another object of the invention is to provide such a swinging spout valve of inexpensive construction and with neat and ornamental appearance.

With the above and other objects in view the invention consists in the swinging spout valve as herein claimed and all equivalents.

Referring to the accompanying drawing, the figure represents a sectional view of a swinging spout valve constructed in accordance with this invention.

In this drawing, 10 indicates the valve casing, which in this instance is angular for mounting it on the vertical sink back 11. The horizontal portion of the casing terminates in a threaded reduced end and is itself threaded, the threaded portions of different diameters receiving a flanged supply coupling 12 and a flanged collar 13 respectively, to clamp the edges of the opening of the sink back between them.

The vertical upturned end of the casing has a reduced portion 14 forming a shoulder 15 and is further reduced and screw threaded at 16 to receive a packing nut 17, which has a cylindrical portion preferably of the same diameter as the casing.

A swinging spout member 18 has a vertical bore through its end to closely fit on the reduced portion 14 of the casing, which bore is countersunk at both ends to enable it to also surround and fit the shoulder 15 of the casing and the cylindrical portion of the packing nut 17, thus forming packing glands at both ends of the bore closed by the casing and the packing nut respectively. Packing rings 19 occupy said glands with washers 20 above and below them and the tightening of the packing nut 17 serves to compress both of the packing rings to prevent leakage.

A valve member 21 has a quick thread engaging with internal threads in the upper end of the casing and its stem 22 passes through a packing cap 23, threaded on the screw threaded portion 16, and is provided with a handle 24. At its lower end, the valve member carries a removable valve face 25 seating on a valve seat 26.

Above the valve seat, the casing is provided with outlet ports 27 and the pivotal head of the spout 18 has an annular groove 28 in its bore registering with said ports in any position of the spout and communicating with the passageway through the spout.

With this invention the swinging spout is mounted directly on the valve casing and may be swung freely to any position to conduct the water where desired without leakage.

What I claim as new and desire to secure by Letters Patent is:

A swinging spout valve for sinks, comprising an angular casing having a reduced end on its horizontal portion, said casing and said reduced end being screw threaded, a flanged collar threaded on the casing and a flanged supply coupling threaded on said reduced end to clamp the sink back between them, the upturned end of the casing having a reduced portion forming a shoulder and a screw threaded end, a spout member having a vertical bore fitting on the reduced portion of the upturned end of the casing, a packing nut threaded on the end of the casing and provided with a cylindrical portion, the ends of the bore of the spout member being countersunk to fit on the shoulder of the casing and the cylindrical portion of the packing nut respectively, to form packing glands at both ends of the bore, packing rings contained in the packing glands, a packing cap threaded on the end of the casing, a valve member threaded in the casing, a stem thereon passing through the packing cap, a handle on the stem, a valve face on the valve member, and a valve seat in the casing adapted to be engaged by the valve face, there being outlet ports in the valve casing beyond the valve seat and an annular groove in the bore of the spout member registering therewith and communicating with the passageway of the spout member.

In testimony whereof, I affix my signature.

FRANK G. BROTZ.